US008781450B2

(12) United States Patent
Behzad et al.

(10) Patent No.: US 8,781,450 B2
(45) Date of Patent: Jul. 15, 2014

(54) METHOD AND SYSTEM FOR CREATING A PERSONALIZED JOURNAL BASED ON COLLECTING LINKS TO INFORMATION AND ANNOTATING THOSE LINKS FOR LATER RETRIEVAL

(75) Inventors: Arya Behzad, Poway, CA (US); Mark Buer, Gilbert, AZ (US); Jeyhan Karaoguz, Irvine, CA (US); Alexander MacInnis, Ann Arbor, MI (US); Thomas Quigley, Franklin, NC (US); John Walley, Ladera Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 403 days.

(21) Appl. No.: 13/225,056

(22) Filed: Sep. 2, 2011

(65) Prior Publication Data

US 2012/0066221 A1 Mar. 15, 2012

Related U.S. Application Data

(63) Continuation of application No. 11/861,224, filed on Sep. 25, 2007, now Pat. No. 8,027,668.

(60) Provisional application No. 60/950,947, filed on Jul. 20, 2007.

(51) Int. Cl.
*H04M 3/42* (2006.01)

(52) U.S. Cl.
USPC .................. 455/414.3; 455/414.1; 455/414.2; 455/414.4; 455/456.1; 455/456.3; 455/466; 340/573.1; 340/539.1; 340/539.12; 340/539.13; 340/539.19; 340/539.2

(58) Field of Classification Search
USPC ......................... 455/456.1–456.6, 457, 414.3; 340/573.1, 539.1, 539.12, 539.13, 340/539.19, 539.2
See application file for complete search history.

(56) References Cited

U.S. PATENT DOCUMENTS 5,552,806 A  9/1996 Lenchik
5,646,608 A  7/1997 Shintani
(Continued)

FOREIGN PATENT DOCUMENTS

EP  1045355 A1  10/2000
WO  2005078676 A2  8/2005

OTHER PUBLICATIONS

International Search Report, PCT/IL2005/000191, mailed Sep. 9, 2005, 5 pages.
Seagate Technology LLC. Seagate DAV.E. (Digital Audio Video Experience) Transform the consumer digital content experience with the Seagate DAV.E. design concept, Data Sheet, 2007.
(Continued)

*Primary Examiner* — Olumide T Ajibade Akonai
(74) *Attorney, Agent, or Firm* — Oblon, Spivak, McClelland, Maier & Neustadt, L.L.P.

(57) ABSTRACT

A system and method is provided for handling data in wireless communication devices where data may be captured and linked to a personal journal via indexing and mapping of context data tags abstracted from captured data. The captured data may be retrieved by matching a query to one or more context data tags indexed and mapped to the personal journal. A user preference utilizing one or more of the context data tags linked to the personal journal may facilitate captured data retrieval. The captured data may include multimedia data of an event pre-tagged with indexed information such as user ID, time, date, location and environmental condition or optionally one or more user's biometric data in response to the event. The pre-tagged captured data may be stored in the local host device or transferred to a remote host or storage for later retrieval or post processing.

29 Claims, 9 Drawing Sheets

(56) References Cited

U.S. PATENT DOCUMENTS

| | | | |
|---|---|---|---|
| 6,314,297 B1 | 11/2001 | Karl | |
| 7,151,920 B2 * | 12/2006 | Eiden et al. | 455/403 |
| 7,203,486 B2 | 4/2007 | Patel | |
| 7,813,557 B1 * | 10/2010 | Bourdev | 382/205 |
| 2002/0052207 A1 | 5/2002 | Hunzinger | |
| 2004/0077359 A1 | 4/2004 | Bernas et al. | |

OTHER PUBLICATIONS

Seagate Technology LLC, Seagate DAV.E. (Digital Audio Video Experience) The portable storage platform that collects, plays and manages digital content, Product Overview, 2007.
TODAYSTHV.COM, KTHV Little Rock (Mind-Reading Toys Wave Of The Future) The Associated Press, Apr. 30, 2007.

* cited by examiner

Biometric Data Mapping Table

|   | E+ | E- | M+ | M- | C+ | C- | P+ | P- |
|---|---|---|---|---|---|---|---|---|
|   | Mood Condition 134b | | Mental State 134c | | Character Condition 134d | | Physical Condition 134a | |
| 1 | Happy | Upset | Decisive | Hesitant | Truthful | Not Truthful | Comfortable | Hungry |
| 2 | Peaceful | Agitated | Confident | Lack Confidence | Credible | Not Credible | | Cold |
| 3 | Pleased | Angry | Calm | Startled | Kind | Unkind | | Hot |
| 4 | Excited | Outraged | Alert | Unclear | Aggressive | Passive | Relaxed | Fever |
| 5 | Relaxed | Rushed | Agreement | Disagreement | Courteous | Uncourteous | | Blood Pressure Rise |
| 6 | | Anxious | | | Enthusiastic | Indifferent | | Nausea |
| 7 | Uplifting | Sad | | | Proactive | Reactive | | Sweating |
| 8 | | Grief | | | Brave | Timid | Muscle Relax | Breathing Rate Rise |
| 9 | Hopeful | Depressed | | | Pleasant | Rude | | Muscle Tension |
| 10 | Motivated | Demotivated | | | Deliberate | Unfocused | Comfortable | Uncomfortable |
| 11 | Satisfied | Dissatisfied | | | | | Strong | Weak |
| 12 | | | | | | | Loud | Soft |
| 13 | ... | ... | ... | ... | ... | ... | ... | ... |

FIG. 1F

METHOD AND SYSTEM FOR CREATING A PERSONALIZED JOURNAL BASED ON COLLECTING LINKS TO INFORMATION AND ANNOTATING THOSE LINKS FOR LATER RETRIEVAL

CROSS-REFERENCE TO RELATED APPLICATIONS/INCORPORATION BY REFERENCE

The present application is a continuation of U.S. application Ser. No. 11/861,224 filed Sep. 25, 2007, which makes reference to, claims priority to and claims the benefit of: U.S. Provisional Patent Application Ser. No. 60/950,947 filed on Jul. 20, 2007.

This application also makes reference to:
U.S. patent application Ser. No. 11/861,220 filed Sep. 25, 2007; and
U.S. patent application Ser. No. 11/861,219 filed on Sep. 25, 2007.

Each of the above stated applications is hereby incorporated herein by reference in its entirety.

FIELD OF THE INVENTION

Certain embodiments of the invention relate to wireless communication. More specifically, certain embodiments of the invention relate to a method and system for creating a personalized journal based on collecting links to information and annotating those links for later retrieval.

BACKGROUND OF THE INVENTION

The field of wireless communication has seen dramatic growth over the last few years. Currently, most people use their wireless devices, be it cellular phones, PDA's, laptops, and/or other devices, for various purposes, business and personal, on a constant and daily basis. Society is truly becoming a wireless one. Many wireless solutions have been introduced, and have made tremendous strides into everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits. WPAN may be based on standardized technologies, for example Class 2 Bluetooth© technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a wider range. In contrast to the WPAN systems, WLAN provide connectivity to devices that are located within a slightly larger geographical area, such as the area covered by a building or a campus. WLAN systems are generally based on specific standards, for example IEEE 802.11 standard specifications to supplement the communication capacity provided by traditional wired Local Area Networks (LANs) installed in the same geographic area as the WLAN system.

In short, wireless networks may exist to support wireless mobile communication devices (WMCDs). However, while WMCDs have continued to grow in complexity and capability, these WMCDs still continue to suffer from some major limitations, especially physical limitations and power.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A method and/or system is provided for creating a personalized journal based on collecting links to information and annotating those links for later retrieval, substantially as shown in and/or described in accordance to at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1F is a diagram that illustrates an exemplary biometric event data mapping table generated through a context data tag abstraction process via links to data detected from biometric sensors, in accordance with an exemplary embodiment of the invention.

DETAILED DESCRIPTION OF THE INVENTION

Certain aspects of the invention may be found in a method and system for creating a personalized journal based on collecting links to information and annotating those links for later retrieval. Exemplary aspects of the invention may comprise linking captured data to a personal journal via indexing and mapping of context data tags abstracted from captured data. The captured data may be later retrieved from memory, for example, by matching a query to one or more context data tags indexed and mapped to the personal journal. The use of a user preference may facilitate captured data retrieval where the user preference may comprise utilizing one or more of the context data tags linked to the personal journal.

The captured data may be acquired via a data acquisition system or via direct input to a local host device. The captured data may comprise multimedia data of an event pre-tagged with indexed information such as user ID, time, date, location and environmental condition of a captured event. Additionally one or more user's biometric event data in response to the event may be used to pre-tag the captured data. The pre-tagged captured data may be stored in the local host device or transferred to a remote host or storage for post processing.

Figure 1A:
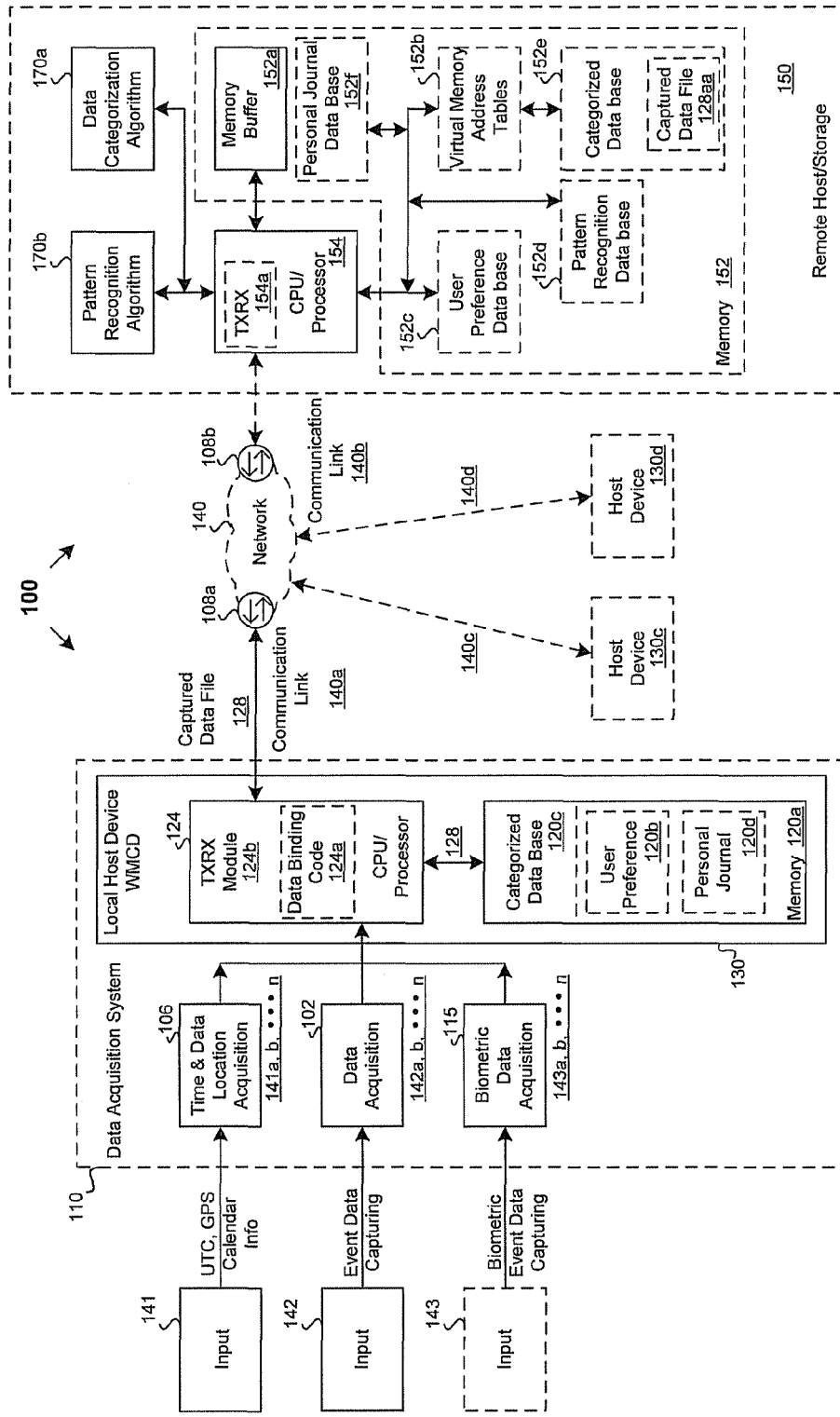
FIG. 1A is a block diagram of an exemplary data capturing system used for capturing data event and pre-tagging captured data for a personalized journal, in accordance with an exemplary embodiment of the invention.

FIG. 1A is a block diagram of an exemplary data capturing system used for capturing data event and pre-tagging captured data for a personalized journal, in accordance with an exemplary embodiment of the invention. Referring to FIG. 1A, there is shown an exemplary data capturing system 100 comprising a plurality of inputs 141, 142 and optionally 143, a data acquisition system 110, one or more optional additional host devices 130c, 130d communicating to the data acquisition system 110 and to an optional remote host or storage 150 through an optional communication network 140. The inputs 141, 142 and optionally 143 may be captured as a prompted event based on user intervention, as an automatic event without user intervention, a continuous event or a combination of the above.

The input 141 may comprise at least one of the inputs of time, date and location information that may be obtained via GPS signals. The input 141 may be used for time, date and location stamping of data acquired from input 142. The input 141 of time information may be received in the format of local time, Coordinated Universal Time (UTC) or the Greenwich Mean Time GMT. A local time may be derived from the UTC based on the local geographical location. In another embodiment of the invention, the input 141 may utilize the IEEE 1588-2002 standard for a precision clock synchronized protocol to time stamp data communicated via a network such as the Ethernet. The location information of input 141 may be obtained via GPS signals, where location coordinates may be interpreted to provide detailed location such as street address, city name, zip code, country code. In an exemplary embodiment of the invention, the time, date and location information of the input 141 may be imported from a user's calendar or scheduling application such as the Microsoft Outlook to link a scheduled event to a personal journal. Alternately, the input 141 may be used to generate a calendar of events and to pre-tag a personal journal.

The input 142 may comprise event data or contents of interest intended for storage in the form of analog or digital signals. In an embodiment of the invention, the input 142 may comprise multimedia data content in the form of text, speech, speech to text translation, video, audio or still image data. Exemplary non-multimedia data content such as environmental data related to temperature, humidity, wind speed or air pressure may be included in the data content of input 142.

The optional input 143 may comprise biometric event data of a user that may be used to prompt or trigger data capturing of events from input 142. The biometric event data to input 143, may be classified into two main types: physiological and behavioral biometric event data. A physiological biometric event data may be data related to an event that tests, reads or captures a physical aspect of the body such as facial features, finger prints, hand shape, iris blood vessel pattern (iris scan), DNA sequences, pulse rate, pulse pressure, muscle tension. In addition to the biometric event data of an individual user, surrounding people in the vicinity may contribute biometric event data to the input 143 through additional host devices 130c, 130d where respective biometric event data may be simultaneously communicated to pre-tagged captured data in the local host device such as the WMCD 130 or to the remote host or storage 150 through the communication links 140c and 140d.

A behavioral biometric event data may comprise data indicative of personality, or a behavior change in response to an event taking place. For example, handwriting, voice signature, a rise in pulse pressure, rise in pulse rate, skin temperature changes, sweating, pupil dilation, breathing rate change, change in tone of voice may indicate anxiety, anger, excitement, distress, rigorous physical activities, startle, fear, or mental unrest. Biometric event data from an Electroencephalogram (EEG) that detects brain wave may indicate mental state and mental activity. Speech pattern, tone of voice, speech to text translation and content analysis, galvanic skin response may provide biometric event data as an indication of the circumstances of the environment, type of stimulus received and a reaction to the stimulus.

The optional biometric event data from input 143 may be utilized to construct or reconstruct a story or a personal journal 120d or a personal journal data base 152f based on user experience. A time, date and location correlated biometric event data associating with data collected for an external event may be useful in devising a data linking path to speed up a search algorithm to identify captured event or stored data for future retrieval. Alternately, the biometric event data from input 143 may pre-tag captured data 128 for post processing locally or remotely. Post processing such as generating of a personal journal 120d or personal journal data base 152f, abstraction of context data tags, indexing and mapping the context data tags to the captured data 128 may be discussed in FIGS. 1E to 2C.

The data acquisition system 110 may comprise a plurality of data acquisition devices or sensors 102, 106, 115 and a local host device such as a wireless mobile communication device 130 (WMCD). In an embodiment of the invention, the plurality of data acquisition devices or sensors 102, 106, 115 may be discrete devices or sensors in a distributed system 110. The respective data from inputs 141, 142 and 143 may be communicated to the wireless mobile communication device WMCD 130 through wireless transmission such as using Bluetooth or Wireless Personal Area Network (WPAN) technology. For longer range transmission, a WLAN with a wireless access point, for example, may be used. In another embodiment of the invention, the plurality of data acquisition devices or sensors 102, 106, 115 may be integrated into fewer devices, or into a single wireless mobile communication device WMCD 130 forming an integrated data acquisition system 110. Alternately, a combination of distributed and integrated data acquisition system 110 may be used.

The data acquisition devices or sensors 102 may comprise a plurality of devices or sensors such as a video camera may capture video content or motion pictures, a camera may capture still images, a scanner may capture text, graphics or still images, a voice coder (vocoder), microphone or audio receiver may capture voice or audio data content. Non multimedia environmental sensors such as a thermocouple may capture temperature data, a hygrometer may capture humidity data, a pressure gauge may capture atmospheric pressure data and a Pitot tube may capture air flow velocity. The captured data 142a, 142b to 142n from respective device or sensors 102 may be communicated to the WMCD 130 as digitized raw data, or may be communicated as formatted data frames.

The data acquisition device or sensor 106 may comprise a GPS receiver, a reference clock, time input from the IEEE 1588-2002 standard precision clock synchronized protocol or a data entry by a user at the start of recording the input 102. The data 141a, 141b to 141n may communicate time, date and location information to the WMCD 130 for synchronization with the captured data from respective data acquisition devices or sensors 102 and 115.

The data acquisition device or sensor 115 may comprise a plurality of biometric acquisition devices or sensors. For example, an EKG device with a plurality of electrodes may monitor heart rate or pulse rate, an EEG device with a plurality of electrodes may monitor brain waves pattern and activities, a Galvanic skin response electrode or electrodermic sensor may monitor electrical resistance of the skin as indication of sympathetic activity and emotional arousal. Additionally, a scanner may scan finger print, facial feature, iris blood vessel pattern, monitor pupil dilation, eye movement. A thermal couple may monitor body temperature, a pressure transducer may monitor pulse pressure, a microphone, an audio receiver may record audio data, a vocoder may encode voice and a conductance transducer may monitor body sweat. The acquired biometric event data 143a, 143b to 143n may be communicated to the WMCD 130 as digitized raw data, or may be communicated as a higher level interpreted data such as an emotional or mental state indication.

The wireless mobile communication device (WMCD) 130 may comprise a memory 120a, a CPU or a processor 124, an integrated transmit/receive communication interface (TXRX module) 124b. The WMCD 130 may perform services and functions such as a smart mobile phone, a PDA and may communicate to external devices through wireless communications such as Bluetooth. The WMCD 130 may include other function as a local host device to perform a range of tasks such as data management, data binding or formatting the captured data 142a to 142n into another data format such as tagging captured data 128 for network transmission. In an embodiment of the invention, data binding codes 124a may be used to tag or pre-tag the captured data 142a to 142n with suitable identifications such as time, date or location data 141a to 141n and/or biometric event data 143a to 143n.

The captured data 128 may be optionally pre-tagged biometrically and stored locally into the memory 120a in the WHCD 130 as a personal journal 120d. The context data tags may be abstracted from the captured data 128 in the form of text to link to the captured data 128. The context data tags may be categorized, indexed and mapped to the captured data 128 for later retrieval. Exemplary steps of abstraction, indexing and mapping of the context data tags may be discussed in FIGS. 2A to 2C.

The WMCD 130 may store a user preference 120b for the captured data file 128. The user preference 120b may comprise a link to associate information or data 141a to 141n such as the time, date, location stamps and the biometric events data 143a to 143n to identify the captured data 142a to 142n. The user preference 120b may comprise using a plurality of context data tags to link information or data such as identity (ID) of user, devices, time, date, location stamps and the biometric events data 143a to 143n to identify the captured data 142a to 142n. The user preference 120b may be stored in the memory 120a of the WMCD 130, and may be triggered to retrieve captured data efficiently from the categorized data base 120c.

The personal journal 120d may be a record of event entries arranged by time, date and/or location reporting on what has happened over the course of a period. The record of event may be generated via indexing of context data tags. The optional biometric events data 143a to 143n may be mapped to a biometric event data base unique to the respective person. Additionally, if multiple biometric events from multiple users may optionally be mapped, parsed or appended to the local host captured data 128 concurrently at the time the data input 142a to 142n were acquired. One or more user preferences or as an updated user preference may link to one or more corresponding biometric event data bases from corresponding users. The captured data 128 may be retrieved with a user query to recall or match to one or more context data tags in the user preferences 120b to match one or context data tags in the personal journal 120d. Further discussion on an alternate embodiment to parse or map multiple users' biometric data event into the captured data input 142a to 142n are discussed in U.S. patent application Ser. No. 11/861,224, filed Sep. 25, 2007, which is incorporated by reference in its entirety.

In an alternate embodiment of the invention, the capture data 128 may be stored or further processed in an optional remote host or storage 150. For example, if the local host device 130 has limited memory for storage, it may be desirable to store the captured data 128 in the remote host or storage 150. Other reasons may be due to conserving the battery of the WHCD 130, limited processing capacity in the CPU/processor 124, or a lack of appropriate application to process the captured data 128 in the local host device 130.

In another embodiment of the invention, the WMCD 130 may comprise suitable hardware, logic, circuitry, and/or code that may be adapted to provide wireless router functions to enable routing or transmission of respective data 141a to 141n, 142a to 142n, 143a to 143n as unprocessed raw data format to be stored in the remote host or storage 150 for further processing.

For remote processing, the transmit/receive TXRX module 124b may communicate the raw data 141a to 141n, 142a to 142n, 143a to 143n or the captured data 128 through a communication link 140a to the remote host or storage 150. Simultaneously, other host devices 130c and 130d may be communicating additional data such as multimedia data or biometric data to the local host device 130 or remote host device 150 through communication links 140c and 140d. The communication links 140a to 140d may communicate to a network 140 such as the Ethernet via a wired link or a wireless link. The communication links 140a to 140d may be encrypted for secured communication among the local host devices WMCD 130, 130c, 130d and the remote host or storage 150.

The local host device as WMCD 130, the additional host devices 130c and 130d and the remote host or storage 150 may comprise suitable hardware, logic, circuitry, and/or code that may be adapted to provide wired or wireless networking operations through communication links 140a to 140d. The wired or wireless communication links 140a, 140b may be accessed from a WLAN infrastructure network 140 via a portal 108a and 108b. The portal 108a and 108b may comprise suitable hardware, logic, circuitry, and/or code and may be adapted to integrate the WLAN infrastructure network 140 with non-IEEE 802.11 networks. Moreover, the portal 108a and 108b may also be adapted to perform the functional operations of a bridge, such as range extension and/or translation between different frame formats, in order to integrate the WLAN infrastructure network 140 with IEEE 802.11-based networks.

In an embodiment of the invention, the remote host or storage 150 may comprise a CPU/processor 154, an integrated TXRX module 154*a*, a memory 152, one or more applications such as a data categorization algorithm and/or a pattern recognition algorithm. The remote host or storage 150 may have similar functions as the local host device WMCD 130, except may be with expanded capacity in the memory 152, the CPU/processor 154 processing power, or with the necessary operating system and applications for processing, categorizing, reading and writing the captured data 128 into the various data bases.

A data categorization algorithm 170*a* may be executed under an operating system by the CPU/Processor 154 in the memory buffer 152*a* to perform categorization on the captured data 128. The data categorization algorithm 170*a* may comprise one or more applications to sort and analyze one or more data segments according to the instructions provided in the header portion of the captured data 128. Further description of an exemplary data structure of the captured data 128 will be discussed with respect to FIG. 1C. In this exemplary data structure, the captured data 128 may comprise data segments to include user name, device type, time, date, location information, multimedia data and biometric event data. The data categorization algorithm 170*a* may generate or update a plurality of virtual memory address tables 152*b* that categorize and link respective data segments to physical memory locations in a categorized database 152*e*. The same data categorization algorithm 170*a* may be executed to perform categorical search in the virtual memory address tables 152*b* for data retrieval.

A pattern recognition algorithm 170*b* may be executed under an optional operating system by the CPU/Processor 154 in the memory buffer 152*a* to perform pattern recognition functions. The pattern recognition functions may comprise update or generation of pattern recognition data base 152*d*, user biometric event data check, authentication and verification. The pattern recognition algorithm 170*b* may comprise a plurality of biometric event data mapping applications and/or code, neural network intelligence application or artificial intelligence applications.

The pattern recognition algorithm 170*b* may analyze the collected biometric event data from the captured data 128 to infer mood, mental state, character portrayal, personality analysis, physical activities or health conditions at the input 141 time instances, when input event data 142 and 143 were captured. The pattern recognition analysis may comprise voice recognition, speech to text translation content analysis, speech pattern analysis, EEG brain waves pattern, eye movements, galvanic skin response, EKG pulse rate, breathing rate, pulse pressure, pupil dilation and muscle tension analysis.

The inferred results from the pattern recognition analysis may be dynamically generated or mapped to a category in a biometric event data mapping table 134 under the categorized database 152*e*. An unrecognized pattern may be generated and categorically stored as a new template with digitized biometric event data pattern in the pattern recognition data base 152*d*. A user preference 152*c* may be generated or dynamically updated to link the captured data 128 to the categorized data base 152*e*. The user preference 152*c* may comprise a plurality of instances with data tags that links the user preference 152*c* to the virtual memory address tables 152*b* such that data may be fetched from the categorized data base 152*e* based on linked address routes.

The information in the user preference 152*c*, the pattern recognition database 152*d* and the captured data 128*aa* in the categorized data base 152*e* from the remote host or storage 150 may be retrieved and communicated to the WMCD 130 or any available resources in a network upon user's request and upon successful authentication and verification of user's identity and user's preference 152*c* based on biometric event data. The generation of user's preferences and rendering of multimedia content on dissimilar format devices based on user's biometric event data is disclosed in U.S. application Ser. No. 11/861,219, titled "Method And System For Configuring Local And Remote Resources To Accomplish Rendering Of Multimedia Content On Dissimilar Format Devices Based On User Biometric Data" filed on Sep. 25, 2007, and is incorporated herein by reference in its entirety.

Figure 1B:
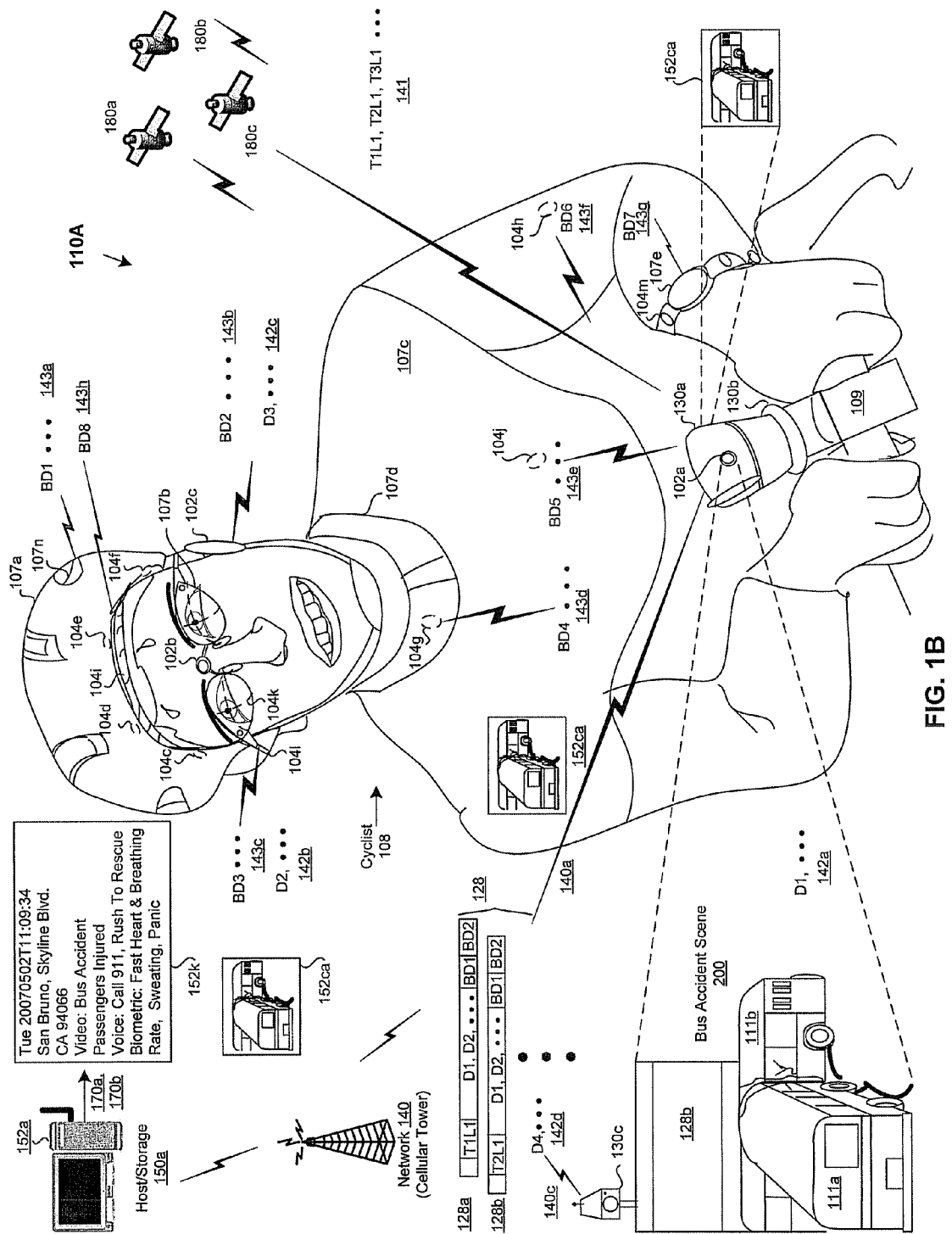
FIG. 1B is a block diagram that illustrates an exemplary physical implementation of a data acquisition system capturing data event and pre-tagging captured data for a personalized journal, based on user's biometric event data, in accordance with an exemplary embodiment of the invention.

FIG. 1B is a block diagram that illustrates an exemplary physical implementation of a data acquisition system capturing data event and pre-tagging captured data for a personalized journal, based on user's biometric event data, in accordance with an exemplary embodiment of the invention. Referring to FIG. 1B, there is shown a data acquisition system 110A worn by a user (Cyclist) 108 witnessing a bus accident scene or event 200 and triggering communication of a captured data 128 to a remote host or storage 150*a* through a wireless network 140*a*. The data acquisition system 110A may comprise a plurality of data acquisition devices and sensor such as a Bluetooth enabled hearing and speech device 102*c*, a Bluetooth enabled cyclist helmet 107*a*, a Bluetooth enabled cyclist goggle 107*b*, a Bluetooth enabled cyclist jersey 107*c*, a Bluetooth enabled wrist watch 107*e*, and a local host device such as a wireless mobile communication device (WMCD) 130*a*. In this example, the time date, location data from input 141 and measured biometric event data BD1 to BD8 may be used to pre-tag multimedia data captured in the bus accident scene or event 200.

The Bluetooth enabled hearing and speech device 102*c* may capture and communicate the audio data D3 142*c* of the cyclist 108 such as an emergency 911 phone call via the WMCD 130*b*. The audio receiver of the Bluetooth enabled hearing and speech device 102*c* may pick up audio data D3 142*c* content including surrounding sound of the bus accident scene 200, the 911 operator dialogue content and the heavy breathing biometric event data BD2 143*b* of the cyclist 108 peddling towards the scene to render rescue to injured passengers. The audio data D3 142*c* and biometric event data BD2 143*b* may be communicated through Bluetooth wireless signals and stored into the WMCD 130*a* local memory. Alternately, the audio data D3 142*c* and biometric event data BD2 143*b* may be communicated to the remote host or storage 150*a* as captured data 128 through a communication link 140*a* such as a cellular network 140.

The Bluetooth enabled cyclist helmet 107*a* may capture and communicate the brain wave pattern of the cyclist 108 in response to witnessing the bus accident scene 200. The Bluetooth enabled cyclist helmet 107*a* may comprise a cyclist helmet with embedded EEG electrodes 104*c*, 104*d*, 104*e* and 104*f* to measure the left and right brain activities. The Bluetooth enabled cyclist helmet 107*a* may also comprise a thermocouple/conductance electrode 104*i* along the forehead of the cyclist 108 to measure the temperature and skin moisture conductivity data (sweat detection). The EEG brain wave data, temperature data and the moisture conductivity data may be communicated respectively as BD1 143*a* and BD8 143*h* through a patch antenna 107*n* on the Bluetooth enabled cyclist helmet 107*a* to the WMCD 130*a* through Bluetooth wireless signals.

The Bluetooth enabled cyclist goggle 107b may capture and communicate snap shots of still images of the scene, or detect eye movements and pupil dilation of the cyclist 108, in response to witnessing the bus accident scene 200 event. The Bluetooth enabled cyclist goggle 107b may comprise a camera 102b to capture still images of the bus accident scene 200 event as data D2 142b. In an embodiment of the invention, the goggle lens may be a scanner with targeting cross hair grids 104k to detect eye movement and pupil dilation, capturing biometric event data BD3 143c. The Bluetooth enabled cyclist goggle 107b may use a goggle frame antenna 104l to communicate data D2 142b and biometric event data BD3 143c to the WMCD 130a through Bluetooth wireless signals.

The Bluetooth enabled cyclist jersey 107c may capture and communicate biometric event data such as pulse rate, EKG heart rhythm, breathing pattern, muscle tension and Galvanic skin response of the cyclist 108, in response to witnessing the bus accident scene 200. The Bluetooth enabled cyclist jersey 107c may comprise embedded pressure transducers or electrodes 104g, 104h and 104j. Pressure transducers, or electrodes 104g may be embedded on the collar 107d to measure the pulse rate or Galvanic skin response as biometric event data BD4 143d. Pressure transducers or electrodes 104h may measure muscle tension or Galvanic skin response as biometric event data BD6 143f. Pressure transducers or electrodes 104j may measure the EKG heart rhythm or pulse rate or breathing pattern as biometric event data BD5 143e. The biometric event data BD4 143d to BD6 143f may be communicated to the WMCD 130a through Bluetooth wireless signals.

The Bluetooth enabled wrist watch 107e may capture and communicate biometric event data such as pulse rate, pulse pressure, EKG heart rhythm, muscle tension and Galvanic skin response of the cyclist 108, in response to witnessing the bus accident scene 200. In an embodiment of the invention, the Bluetooth enabled wrist watch 107e may function as a local host device with similar functions as the WMCD 130a such as a smart phone capable of communicating or transferring captured data 128 to the wireless network 140a. The Bluetooth enabled wrist watch 107e may comprise embedded pressure transducers or electrodes 104m capable of measuring pulse rate, pulse pressure, EKG heart rhythm, muscle tension and Galvanic skin response of the cyclist 108 as biometric event data BD7 143g. The biometric event data BD7 143g may be communicated to the WMCD 130a through Bluetooth wireless signals.

The WMCD 130a may capture and communicate video clips D1 142a or snap shots of still images of the bus accident scene or event 200 between buses 111a and 111b. In an embodiment of the invention, the video or still camera 102a on the WMCD 130a may follow the eye movements detected by the targeting cross hair grids 104k of the Bluetooth cyclist goggle 107b. The WMCD 130a may be mounted on a motorized micro gyro 130b on the bicycle frame 109 to allow radial movement mimicking the eye movement. In an embodiment of the invention, the WMCD 130a may comprise an optional GPS receiver to receive time, date, and location data TL1 141 from a plurality of GPS satellites 180a to 180c.

A host device 130c such as a surveillance camera 130c above a building 128b may simultaneously be capturing video or still image multimedia data D4 142d of the bus accident scene or event 200 and transferring video multimedia data D4 142d to the WMCD 130a or to the remote host or storage 150a through link 140c. The video or still image data D4 142d may be time stamped by the IEEE 1588-2000 synchronized clock protocol and transmitted in the network 140.

In an exemplary embodiment of the invention, the WMCD 130a may perform data binding on the acquired multimedia data D1 142a, D2 142b, D3 142c, D4 142d with the biometric event data BD1 143a to BD8 143h, and transfer the captured data 128 as formatted data in the form of time, date and location stamped data frames 128a and 128b through wireless network 140a. In another embodiment of the invention, the WMCD 130a may not perform data binding, raw data may be transferred or communicated to the remote host or storage 150a through link 140c. The captured multimedia data D1 142a, D2 142b, D3 142c, D4 142d and the biometric event data BD1 143a to BD8 143h may be time stamped by the IEEE 1588-2000 synchronized clock protocol and transmitted in the network 140.

In another embodiment of the invention, the WMCD 130a may generate a user preference 120b based on biometric event data at the time captured data 128 may be stored in the local memory or communicated to the remote host or storage 150a. The user preference 120b may link the biometric event data such as finger print, iris scan, voice recognition a behavioral condition or mental state of the cyclist 108 in the captured data 128. The user preference 120b may be used to gain future access to the network 140a or to search for captured data of the bus accident scene 200 through a process of user preference authentication, validation using a pattern recognition algorithm 170b.

The remote host or storage 150a may comprise similar functions as the remote host or storage 150 described in FIG. 1A. In an embodiment of the invention, the remote host or storage 150a may use the data categorization algorithm 170a and/or a pattern recognition algorithm 170b to analyze, construct a data mapping table, store a summary or synopsis 152k or generate a user preference icon 152ca with a bus accident scene. The icon 152ca may be communicated and stored locally in the user preference 120b in the form of a graphical user interface (GUI) such as the icon 152ca or as a compressed image file.

Figure 1C:
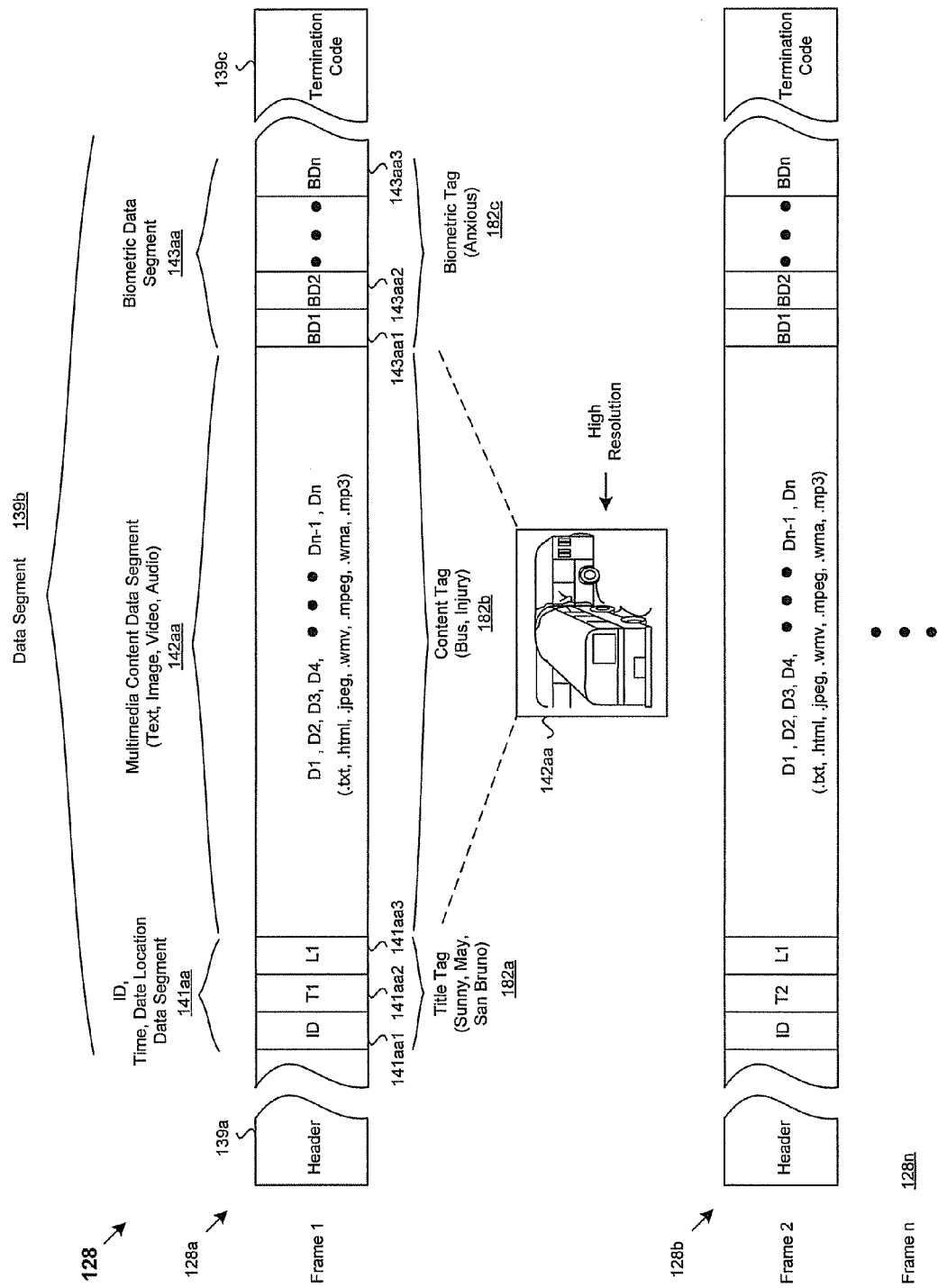
FIG. 1C is a block diagram that illustrates an exemplary data structure of pre-tagged captured data, in accordance with an exemplary embodiment of the invention.
Figure 1D:
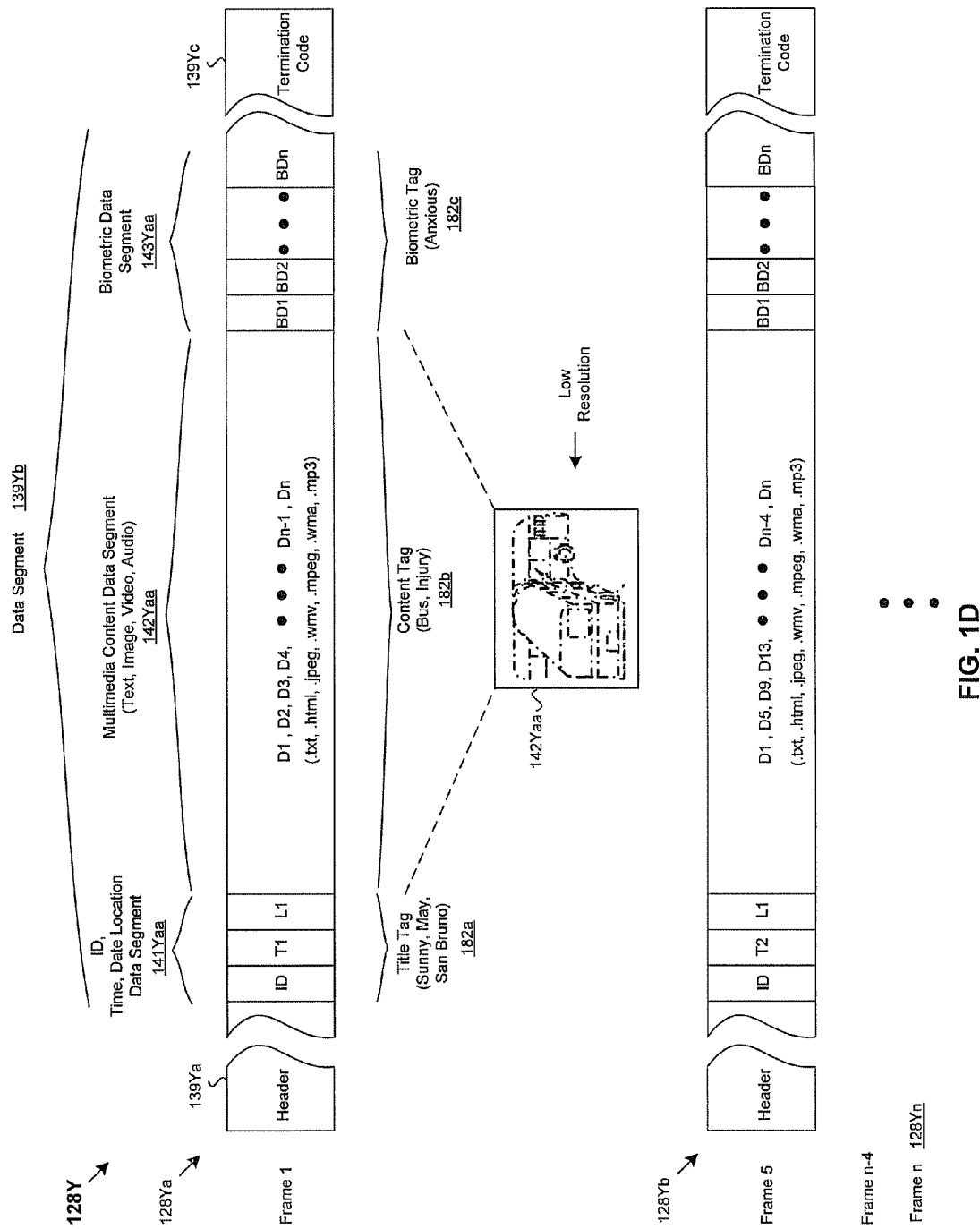
FIG. 1D is a block diagram that illustrates an exemplary data sampling of pre-tagged captured data for memory reduction, in accordance with an exemplary embodiment of the invention.
Figure 1E:
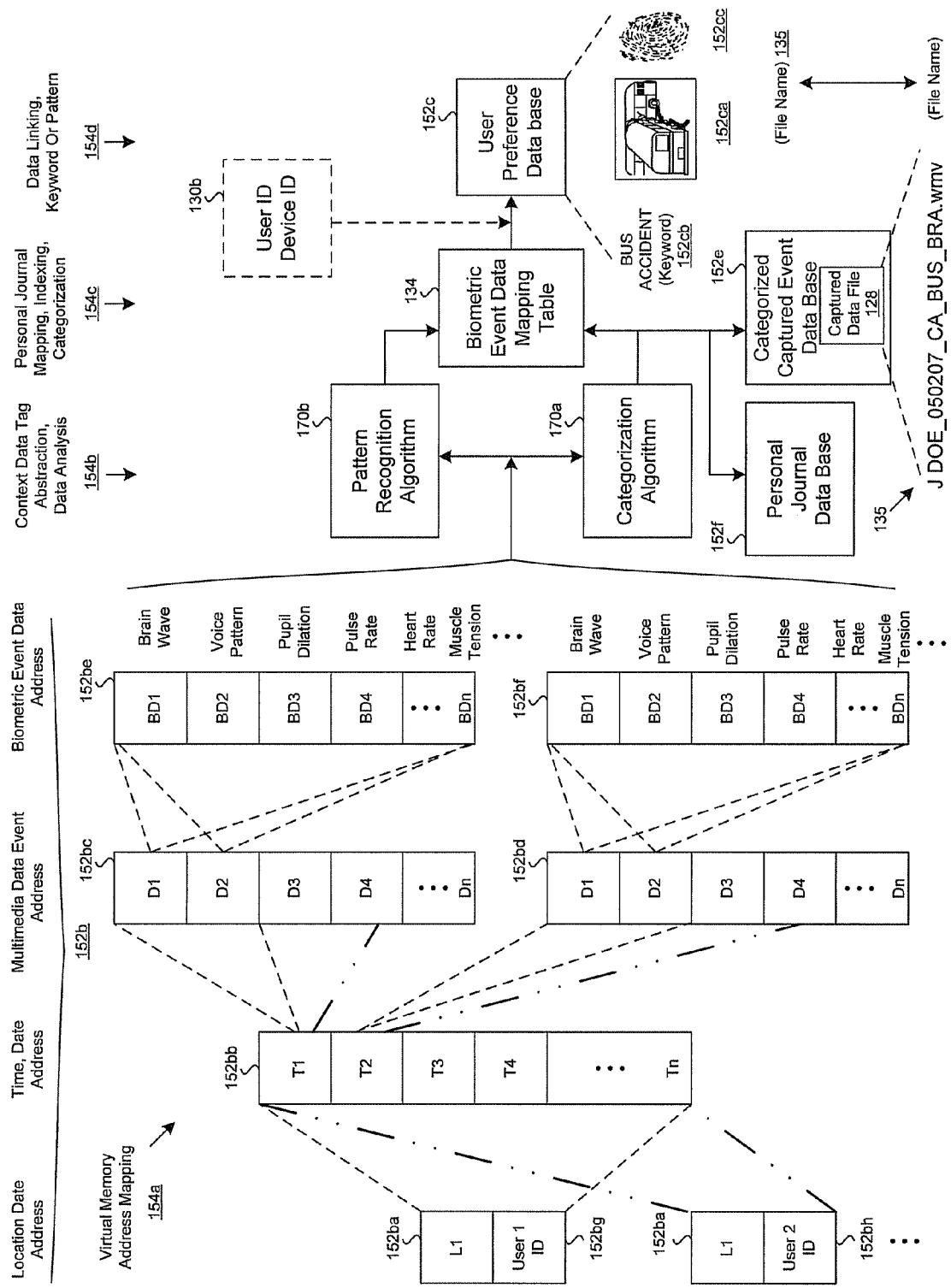
FIG. 1E is a block diagram that illustrates an exemplary process of establishing address links through virtual memory address mapping and generating a user preference based on biometric event data, in accordance with an exemplary embodiment of the invention.

In an alternate embodiment of the invention to be shown in FIG. 1E, the user preference may be a text keyword 152cb abstracted as a context data tag from the captured data 128, a file name 152cd or a biometric event data such as a finger print 152cc of the cyclist 108. In an alternate embodiment of the invention, the user preference may be a spoken phrase "BUS ACCIDENT" 152cb linking the captured data 128 or to the summary 152k of the bus accident scene or event 200 to be displayed on his WMCD 130a or other resources in the network.

To retrieve the captured data 128 from the memory 152, the cyclist 108 may invoke a user query such as selecting the icon 152ca from a GUI on his WMCD 130a, type in a text keyword in a context data tag database, speak the phrase "BUS ACCIDENT" 152cb or use a biometric event data that may relate his experience of witnessing the bus accident scene 200 or event to trigger captured data 128 retrieval. The categorization algorithm 170a or pattern recognition algorithm 170b may search and match the user query to one or more context data tags indexed and mapped to the personal journal 152f in the remote host or storage 150a. The use of a user preference through the icon 152ca or a text keyword from the context data tag may facilitate captured data 128 retrieval.

FIG. 1C is a block diagram that illustrates an exemplary data structure of pre-tagged captured data, in accordance with an exemplary embodiment of the invention. Referring to FIG. 1C, there is shown an exemplary data structure of pre-tagged captured data 128 comprising a plurality of captured data frames 128a, 128b to 128n. In an embodiment of the invention, the WMCD 130a may comprise data binding codes 124a to bind respective captured data 141a to 141n, 142a to 142n and 143a to 143n from the respective plurality of data acquisition devices or sensors 106, 102 and 115 into suitable communication format such as the exemplary captured data frame 128a.

The captured data frame 128a may comprise a header 139a, a data segment 139b and a termination code 139c. The header 139a may comprise data structure information and instructions to read and interpret the data segment 139b. The header information may comprise data format, the start and stop bit of the data frame 128a, bit location of each data segment 141a, 142a and 143a, type of data in each data segment, operating system, application program interfaces and network protocol information such as protocol standard, security permission level or network transport layer. The header instructions may comprise calling for one or more interpreter application to interpret and/or process the data segment 139b.

The data segment 139b may comprise one or more types of data to be interpreted or processed. The data segment 141 as may comprise data relating to the identification of the data such as the identity of the cyclist 108 (user) such as his name or some personal information, a device ID, time, date or location information of the event to be captured. Each data frame 128a may be time, date or optionally location stamped so that data may be categorized for storage or for retrieval in proper time sequence.

The data segment 142aa may comprise acquired multimedia content data, or external data directly transferred or imported to the WMCD 130a from other external devices. In an embodiment of the invention, the multimedia data may be text, still image, graphics, video, audio, speech or a combination of the data type. Data binding format may be in a suitable industry standard for transmission, display or for storage. For example, the multimedia data format may be designated by suffixes such as .txt (text keyboard) or .html (Hypertext Markup Language) for the text and web pages, .jpeg (Joint Photographic Experts Group) for the compressed still images or graphics, .wmv (Windows Media Video) or .mpeg (Motion Pictures Expert Group) for video or motion picture file, .wma (Windows Media Audio) or .mp3 (MPEG Layer 3) for audio or music file format. The data segment 142aa may store or process the multimedia data as high resolution picture frames or video frames in a remote host or storage 150.

The data segment 143aa may comprise acquired digitized readings from biometric devices or sensors. The digitized readings may be analog electrical signals or waveforms converted into digital format for transmission. In this example, the readings from the BD1 to BDn may represent readings of the EEG brain wave, Galvanic skin responses, speech pattern, voice pitch, Iris scanned image, finger print, pulse pressure, pulse rate, eye movements, pupil dilation response, skin conductivity, muscle tension, or EKG heart rhythm.

In an exemplary embodiment of the invention, the data segment 142aa may be pre-tagged with one or more data segments such as the data segment 141 as and/or the data segment 143aa. Pre-tagging the data frame 128a may allow efficient information categorization and identification. In this example, the multimedia data of data segment 143aa may be pre-tagged with ID, time, date, location data in data segment 141aa, and/or pre-tagged with biometric event data in the data segment 143aa. Further post-processing of the captured data frame 128a may allow abstraction of data content in the form of text such as context data in order to tag (context data tag) each of the data segments 141aa, 142aa and 143aa. In this example, "Sunny, May, San Bruno" may be abstracted as context data tag 182a to represent the weather condition, month, and location information from the data segment 141aa. "Bus, Injury" may be abstracted as context data tag 182b to represent the relevant context of the captured bus accident scene or event 200 from the data segment 143aa. "Anxious" may be abstracted as context data tag 182c to represent the cyclist 108 mood condition from the biometric event data in data segment 143aa.

By using context data tags 182a, 182b, 182c in the text form, retrieval of captured data 128 may be accomplished using searching by keyword. The keyword search may allow relevant intelligent information be systematically searched from one or more data bases by known search engines or algorithms. Some of the known search engines or algorithms that may perform keywords or phrase searches on the context data tags to the captured data 128 include the Microsoft's Explorer, Google search engine or the Yahoo search engine. More sophisticated search algorithms may be used such as a Boolean search algorithm that may allow specifying keywords from different search fields. Text format context data tag keyword searches may be extended to many languages through text translator. The termination code 139c may comprise codes to terminate data frame reading, or to perform a parity check. A captured data 128 may comprise of sequences of time stamped captured data frames 128a to 128n. The content of the data segments 141aa, 142aa, 143aa may be extracted by one or more applications called out in the header 139a or in the CPU/processor 154 or 124 for processing.

FIG. 1D is a block diagram that illustrates an exemplary data compression of pre-tagged captured data for memory reduction, in accordance with an exemplary embodiment of the invention. FIG. 1D illustrates a high resolution pre-tagged captured data frames 128a to 128n in FIG. 1C may be processed to a lower resolution pre-tagged captured data frames 128Ya to 128Yn through data compression. The compressed captured data 128Y may be stored on the local host device 130 with substantially less memory or may use less CPU processing time.

An example of accomplishing data compression may be a frame by frame data sampling to reduce the byte size in the multimedia content data segment 142Yaa (the bulk of data segment 139Yb). Another example to accomplish data compression may be sampling the captured data frames 128Ya to 128Yn. For example, storing one out of every four captured frames (frame 1 128Ya, frame 5 128Ye, and frame n-4 128Yn-4, frame n 128Yn) may reduce the memory size of captured data 128 by a factor of four. Likewise, other data segments 141Yaa or 143Yaa may be compressed for data size reduction. Other compression methods may be used without substantial sacrifice of data resolution to achieve data size reduction of the captured data 128Y to be stored in the local host device such as the WMCD 130a or remote host or storage 150a. Besides the benefit of memory reduction to store lower resolution captured data 128Y in the WMCD130a or in the remote host or storage 150a, another benefit may be a shorter retrieval time to retrieve the low resolution captured data 128Y. A low resolution captured data 128Y may have fewer indexed context data tags to be matched in a user query.

FIG. 1E is a block diagram that illustrates an exemplary process of establishing address links through virtual memory address mapping and generating a user preference based on biometric event data, in accordance with an exemplary embodiment of the invention. Referring to FIG. 1E, there is shown a virtual memory address mapping step 154a, a context data tag abstraction and data analysis step 154b (using applicable algorithms 170a and 170b), a personal journal indexing, mapping, data categorization step 154c (to generate a biometric event data mapping table 134 and a categorized data base 152e), a data linking step 154d (to generate user preference with mapped addresses).

The virtual memory address mapping step 154a may comprise using a virtual memory address table 152b to map capture data 128 from a virtual memory address to a physical memory location. The virtual memory address table 152b may be an imaginary memory area supported by an operating system program such as an operating system in conjunction with the hardware associated with the memory 152. Since the captured data 128 may be striped over a distributed area on a memory device such as a RAID drive or on a flash memory, the virtual memory address table 152b may be a logical and convenient description for software programs to process captured data 128. Each of the data segments 141aa, 142aa and 143aa of data frames 128a to 128n is mapped into the new virtual memory location (or the respective physical memory locations) such as the biometric event data mapping table 134 and/or the categorized data base 152e.

The virtual memory address table 152b may be constructed from data extracted from each of data segments 141aa, 142aa and 143aa. In this example, the virtual memory address table 152b may comprise a location and user ID address column 152ba and 152bg, a time and date address column 152bb, a multimedia data address column 152bc, 152bd and a biometric event data address column 152be and 152bf. The location and user ID address column 152ba and 152bg may comprise of location data L1 and user 1 ID with personal data. In this example, the bus accident scene or event 200 may be recorded over time T1 to Tn by user 1 (cyclist 108) in the same vicinity or location L1. The time and date address column 152bb may comprise of time and date data T1 to Tn, corresponding to the respective data frames 128a to 128n.

The multimedia data address column 152bc, 152bd may comprise data D1 to Dn of the data segment 142aa corresponding to the first two captured data frames 128a and 128b. For example, the data D1 may be a video file, D2 may be an image file, D2 may be an audio file, D4 may be a video or still image file. It is not necessary for the multimedia data address column 152bc or 152bd to have all of the mentioned data D1 to Dn be arranged in the ascending or descending order. The order may be random, so long that a linking path for each data D1 to Dn may be established with other related corresponding data.

The biometric event data address column 152be and 152bf may comprise biometric event data BD1 to BDn of the data segment 143aa corresponding to the first two captured data frames 128a and 128b. For example, the biometric event data BD1 may be from the EEG brain wave data of the left and/or right brain for brain activity analysis. The biometric event data BD2 may be from audio speech pattern, speech content, voice pitch for user recognition or for mood condition, mental state, and character or behavior analysis. The biometric event data BD3 may be eye movement detection, pupil dilation, iris scan.

The biometric event data BD4 may be for example pulse rate, pulse pressure, Galvanic skin response data. The biometric event data BD5 to BDn may be from pulse rate, heart rate, EKG heart rhythm pattern, muscle tension, breathing rate. In certain instances, it may not be necessary for the biometric event data address column 152be or 152bf to have all of the mentioned biometric event data BD1 to BDn be arranged in the ascending or descending order. The order may be random, so long as a linking path for each biometric event data BD1 to BDn may be established with other related corresponding data.

In the context data tag abstraction and data analysis step 154b, context data tags in the form of text may be abstracted from the contents in data columns 152bb, 152bc, 152bd, 152be, 152bf respectively. One or more pattern recognition algorithms 170b as applications may be used to translate data content into text context Some of these pattern recognition algorithm may be a speech to text translator, another pattern recognition algorithm may be an image to object identification application where images from moving or still images may be identified macroscopically and/or microscopically, and named by physical parameters such as shapes, sizes, scaling, object proportions, movement and color. Another pattern recognition algorithm may analyze the biometric event data BD1 to BDn through scanned images of user's iris, pupil dilation, eye movements, brain wave pattern, voice pitch, speech content and speech intonation, heart rate changes, muscle tension, galvanic skin response, breathing rate change. The analyzed results of the patterns from the biometric event data in combination with total collected data may infer the user such as the cyclist's 108 behavioral or physiological conditions. Context data tags 182a, 182b, 182c may be abstracted from the text content of the data segments 141aa, 142aa and 143aa respectively.

In the personal journal mapping, indexing and categorization step 154c, the time and date stamped multimedia data D1 to Dn, with biometric event data BD1 to BDn may be analyzed separately or in combination using a categorization algorithm 170a and/or a pattern recognition algorithm 170b. A personal journal 120d or personal journal database 152f may be updated or constructed from the indexed context data tags 182a, 182b, 182c mapped to the captured data 128. Context data tags 182a may be abstracted from time, date location information via the data segment 141aa. Alternately the information may be imported from a calendar from the WMCD 130a. Context data tags 182c from the biometric event data BD1 to BDn may be indexed and mapped to a biometric event data mapping table 134 after abstraction from the data segment 143aa.

One or more updated data bases such as the categorized data base 152e and the biometric event data mapping table 134 may be generated from the multimedia data D1 to Dn. Other data bases such as a context data tag data base 182, a pattern recognition data base 152d and a personal journal data base 152f may be generated and maintained in this step. In this example an exemplary captured data file name 135 "JDOE_050207_CA_BUS_BRA.wmv" may be saved in the categorized data base 152e. The data file name 135 may be user defined, or may be generated from an application algorithm based on the user 1 ID, date or time stamp, location, a context data tag "BUS" from the event and/or a context data tag "BRA" as a brave act of the cyclist 108 from the biometric event data.

A user preference may optionally be specified or defined by the user, the cyclist 108, or may be generated by a user preference algorithm. A user preference data base 152c may comprise a GUI object such as an icon or a compressed image file 152ca of the bus accident, a spoken phrase or a text keyword "BUS ACCIDENT" 152cb, or a biometric event data such as a scanned image of a finger print pattern 152cc of the cyclist 108. Based on the user preference 152c, the CPU/Processor 124 or 154 may execute one or more search engine applications upon a user query to search for the captured data 128 through matching the user query to one or more context data tags that may be indexed and mapped to the personal journal data base 152f. If an additional host device such as the surveillance camera 130c shown in FIG. 1B may be present, the user preference data base 152c may additionally include context data tags abstracted from the multimedia data D4 by user 2 ID 152*bh* (the surveillance camera 130*c*).

FIG. 1F is a block diagram that illustrates an exemplary biometric event data mapping table generated through a context data tag abstraction process via links to data detected from biometric sensors, in accordance with an exemplary embodiment of the invention. Referring to FIG. 1F, the exemplary biometric event data mapping table 134 may be generated from the results of context data tag abstraction, data analysis step 154*b* and personal journal mapping, indexing, categorization step 154*c* described in FIG. 1E. In this example, the exemplary biometric event data mapping table 134 may suggest mapping results of analyzed biometric event data BD1 to BDn of captured data frames 128*a* to 128*n*. The suggested mapped results may have a physiological category comprising a physical condition column 134*a* and a behavioral category comprising a plurality of behavioral columns such as a mood condition column 134*b*, a mental state column 134*c* and a character condition column 134*d*.

Each of the categories, the physical condition 134*a*, the mood conditions 134*b*, the mental state 134*c* and the character conditions 134*d* may further be classified with a positive condition or a negative condition represented by P+, P−, E+, E−, M+, M− and C+, C− to describe the opposing conditions or to contrast the condition for comparison purpose. Other ways of categorizing the biometric event data mapping table 134 may be used. In another embodiment of the invention, a weighing factor or a range may be specified to describe the different degrees of physiological or behavioral conditions.

The biometric event data mapping table 134 may be populated with abstracted context data tags describing a plurality of commonly known health and psychological conditions or events to profile the cyclist's 108 reaction in witnessing the bus accident 200. In this example, for example, the cyclist's 108 physical condition 134*a* may be described in column P+ with a context data tag "strong" 182*d* that may be abstracted from biometric event data BD1 (EEG brain waves), BD4 (Pulse rate), BD5 (EKG heart rhythm, heart rate), BD6 (muscle tension, Galvanic Skin Response), and BD7 (pulse rate). The cyclist's 108 voice was described with a context data tag as "loud" 182*e* compared to normal condition from biometric event data BD2 (voice pattern, pitch, volume). The P− column may indicate the cyclist's 108 body was described with a context data tag "hot" 182*f* from biometric event data BD4 (pulse rate) and BD8 (thermocouple reading, moisture reading from skin conductivity or Galvanic skin response) due to fast peddling to the bus accident scene 200 to render rescue.

Likewise, the mood condition 134*b* may be mapped with indications in column E+ described with a context data tag "motivated" 182*g* from biometric event data BD1 (EEG brain waves), BD2 (speech content analysis, voice pattern), BD3 (eye movement, pupil dilation), BD6 (muscle tension, Galvanic Skin Response). The E− column may indicate the cyclist 108 was described with a context data tag "anxious" 182*h* from biometric event data BD1 (EEG brain waves), BD2 (speech content analysis, voice pattern), BD3 (eye movement, pupil dilation), BD4 (Pulse rate), BD5 (EKG heart rhythm, heart rate), BD6 (muscle tension, Galvanic Skin Response), BD7 (pulse rate) and BD8 (thermocouple reading, moisture reading from skin conductivity or Galvanic skin response).

Similarly, the mental state and character condition of the cyclist 108 may be found from the biometric event data mapping table 134 shown in FIG. 1F with respective highlighted mapped biometric event data. Each condition indicated in the biometric event data mapping table 134 may be generated from combining the results of inferences from context data tag abstraction and data analysis 154*b* using the categorization algorithm 170*a* and the pattern recognition algorithm 170*b* described in FIG. 1E.

Figure 2A:
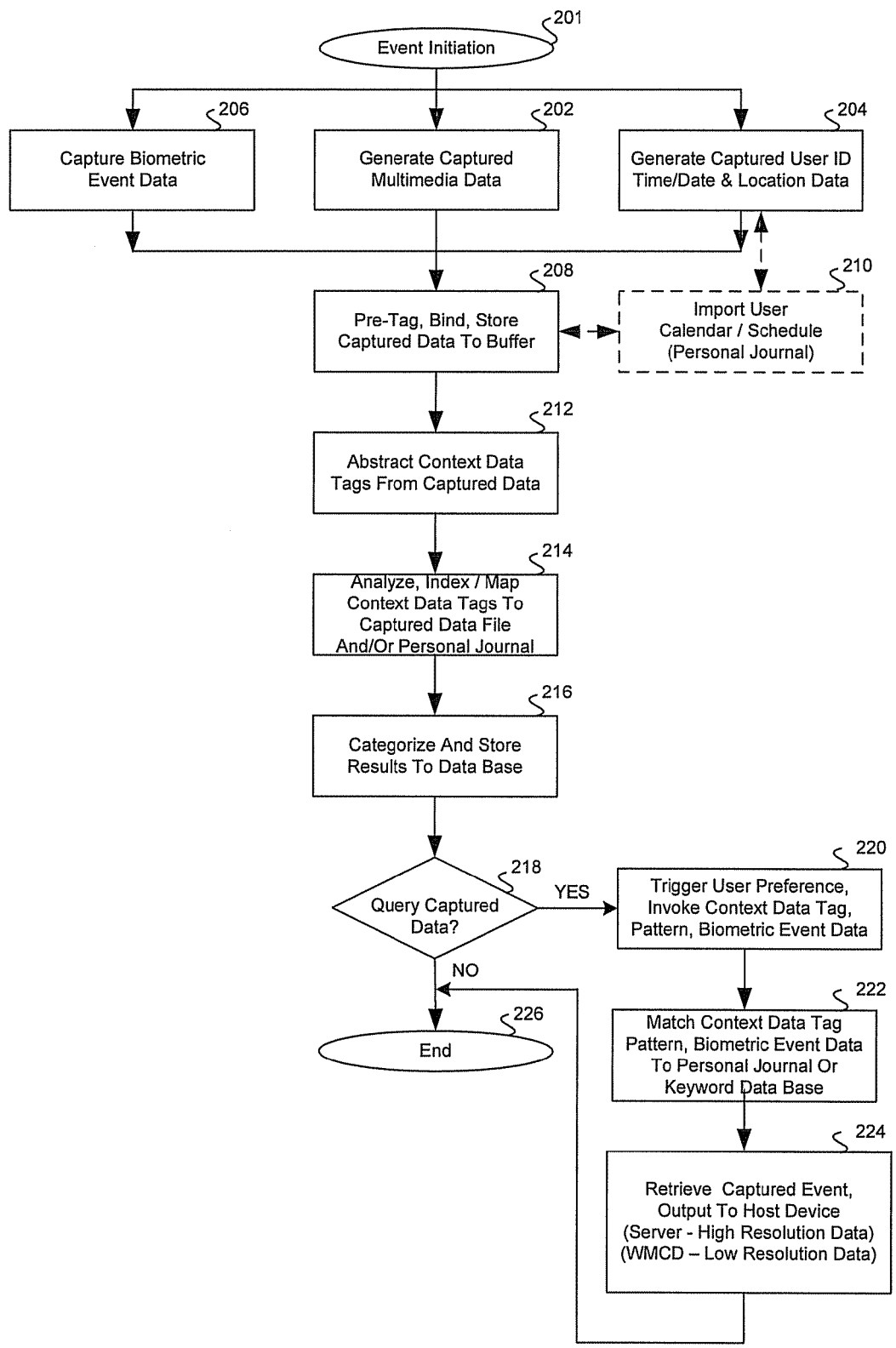
FIG. 2A is a flow diagram illustrating exemplary steps for generating a personalized journal on collecting links to information and annotating those links for later retrieval, in accordance with an exemplary embodiment of the invention.

FIG. 2A is a flow diagram illustrating exemplary steps for generating a personalized journal on collecting links to information and annotating those links for later retrieval, in accordance with an exemplary embodiment of the invention. Reference designations from FIGS. 1A to 1F may be referred to in the description of the steps in FIG. 2A to 2C. Referring to FIG. 2A following start step 201, data acquisitions may take place in steps 202, 204 and 206. Step 202 may acquire or capture data input 142 from an event such as the bus accident scene or event 200. In step 202, the input data 142 may be captured as multimedia data 142*a* to 142*n* by a data acquisition system 102 comprising at least one or more devices or sensors such as a WMCD 130*a* (local host device), a Bluetooth enabled cyclist goggle 107*b*, and/or a Bluetooth enabled hearing and speech device 102*c*. The WMCD 130*a* may capture data text, video or still image multimedia data D1 142*a*, the Bluetooth cyclist goggle 107*b* may capture text, or still image multimedia data D2 142*b*, and the Bluetooth enabled hearing and speech device 102*c* may capture audio data D3 142*c*.

In step 204, user ID, time, date data T1 to Tn may be acquired via a reference clock, time data from the IEEE 1588-2002 standard precision clock synchronized protocol or a data entry by a user at the start of recording multimedia data 142*a* to 142*n* from data acquisition system 102. Optionally, location data L1 may be acquired with a GPS receiver. The time, date and/or location information may be used for time, date and/or location stamping of the acquired data 142*a* to 142*n*.

In step 206, a plurality of biometric devices or sensors such as the Bluetooth enabled hearing and speech device 102*c*, the Bluetooth enabled cyclist helmet 107*a*, the Bluetooth enabled cyclist goggle 107*b*, the Bluetooth enabled cyclist jersey 107*c* and the Bluetooth enabled wrist watch 107*e* may acquire biometric event data BD1 143*a* to BDn 143*n* such as biometric event data: EEG brain wave, Galvanic skin responses, speech pattern, voice pitch, Iris scanned image, finger print, pulse pressure, pulse rate, eye movement, pupil dilation, skin conductivity, muscle tension, or EKG heart rhythm. In another embodiment of the invention, additional users or additional host devices 130*c*, 130*d* may coordinate to contribute multimedia data or biometric event data to the captured data 128. The respective additional host devices 130*c*, 130*d* may store the pre-tagged captured data 128 for remote post processing and share tasks within the network 140.

In step 208, multimedia data 142*a* to 142*n*, may be pre-tagged with respective time, date, location data 141*a* to 141*n*, and/or biometric event data 143*a* to 143*n* from respective data acquisition devices or sensors 106, 102, 115 in steps 202, 204 and 206. The pre-tagged data may be bound into suitable format for local storage or for transfer to a remote host or storage. In another embodiment of the invention, the captured data from steps 202, 204 and 206 may be stored or transferred as raw data without data binding in step 208. The captured data 128 may be stored with or without data compression. Alternately, the user ID, time, date and/or location information may be imported from a user's calendar or schedule in step 210. The user ID may comprise additional personal data of the user (cyclist 108) that may be useful for generating a personal journal 120*d* or personal journal data base 152*f*. The personal journal 120*d* may link to abstracted context data tags such as 182*a*, 182*b*, 182*c* to captured data 128 through indexing and mapping.

In step 212, context data tags such as 182a, 182b, 182c may be abstracted from the captured data 128 and stored in a context data tag data base 182. In an exemplary embodiment of the invention, the context data tags 182a, 182b, 182c may be abstracted from each data frame 128a to 128n during post-processing of the pre-tagged captured data 128. The post processing may take place in the local CPU/Processor 124 of WMCD 130, or remotely in the CPU/Processor 154 of the remote host or storage 150. The abstracted context data tags 182a, 182b, 182c may be in the form of text, as a recognizable pattern or as biometric event data to be stored in the respective data bases. In step 214, the abstracted context data tags 182a, 182b, 182c may be analyzed, indexed, and mapped to the capture data 128 under a file name 135, to the personal journal 120d, or to the personal journal data base 152f. In step 216, the abstracted context data tags from all data segments 141aa, 142aa and 143aa may be categorized and stored into respective data bases such as the captured event data base 152e, the biometric event data base 134g, the user preference data base 152c, the context data tag data base 182, the pattern recognition data base 152d the biometric event data base 134g and the personal journal data base 152f.

In step 218, captured data 128 may be retrieved remotely from the remote host or storage 150 or locally from the WMCD 130 prompted by a user query. In step 220, the prompted user query may trigger a user preference to invoke a context data tag, a pattern or a biometric data event. Exemplary context data tags that may be used in the user preference may comprise a text such as "SAN BRUNO" 182a abstracted from the ID, date, time or location data segment 141aa, text "BUS ACCIDENT" 152cd abstracted from the multimedia content data segment 142aa, or text "ANXIOUS" 182h abstracted from the biometric event data segment 143aa. An example of invoking an image pattern in the user preference may be selecting the compressed image icon 152ca that may be abstracted from the multimedia content data segment 142aa. An example of invoking a biometric event data in the user preference may be scanning in the user's finger print 152cc into the WMCD 130.

In step 222, one or more data bases may be recalled to match the context data tag, the image icon 152ca or the biometric event data from the user preference. For example, the context data tag "SAN BRUNO" 182a or "BUS ACCIDENT" 152cd may match to the context data tags in the personal journal data base 150f or to the context data tag data base 182. The image icon 152ca may match to the pattern recognition data base 152d. The user's scanned finger print 152cc may match to a biometric event data base 134g or to the pattern recognition data base 152d (pattern recognition algorithm).

In step 222, captured data 128 (high resolution) or 128Y (lower resolution) may be retrieved upon a successful match of the user query to the one or more corresponding data bases. In step 224, a low resolution captured data 128Y may be retrieved from the WMCD 130 to be displayed on the WMCD 130, and a high resolution captured data 128 may be retrieved remotely from the remote host or storage 150 to be displayed on the WMCD 130. With sufficient memory, CPU processing power or availability of applications, captured data 128 (high resolution) may be stored in the WMCD 130. The captured data 128 or 128Y may be retrieved and displayed on other designated resources such as the host devices 130c or 130d within the network 140 by using the same user query. The process may terminate in step 226 if no further user query may be made or no new captured data 128 may be received. The steps of the process in FIG. 2A may be rearranged in a different order or substituted with similar or equivalent operation to accomplish the same results without departing from the scope and spirit of the invention.

Figure 2B:
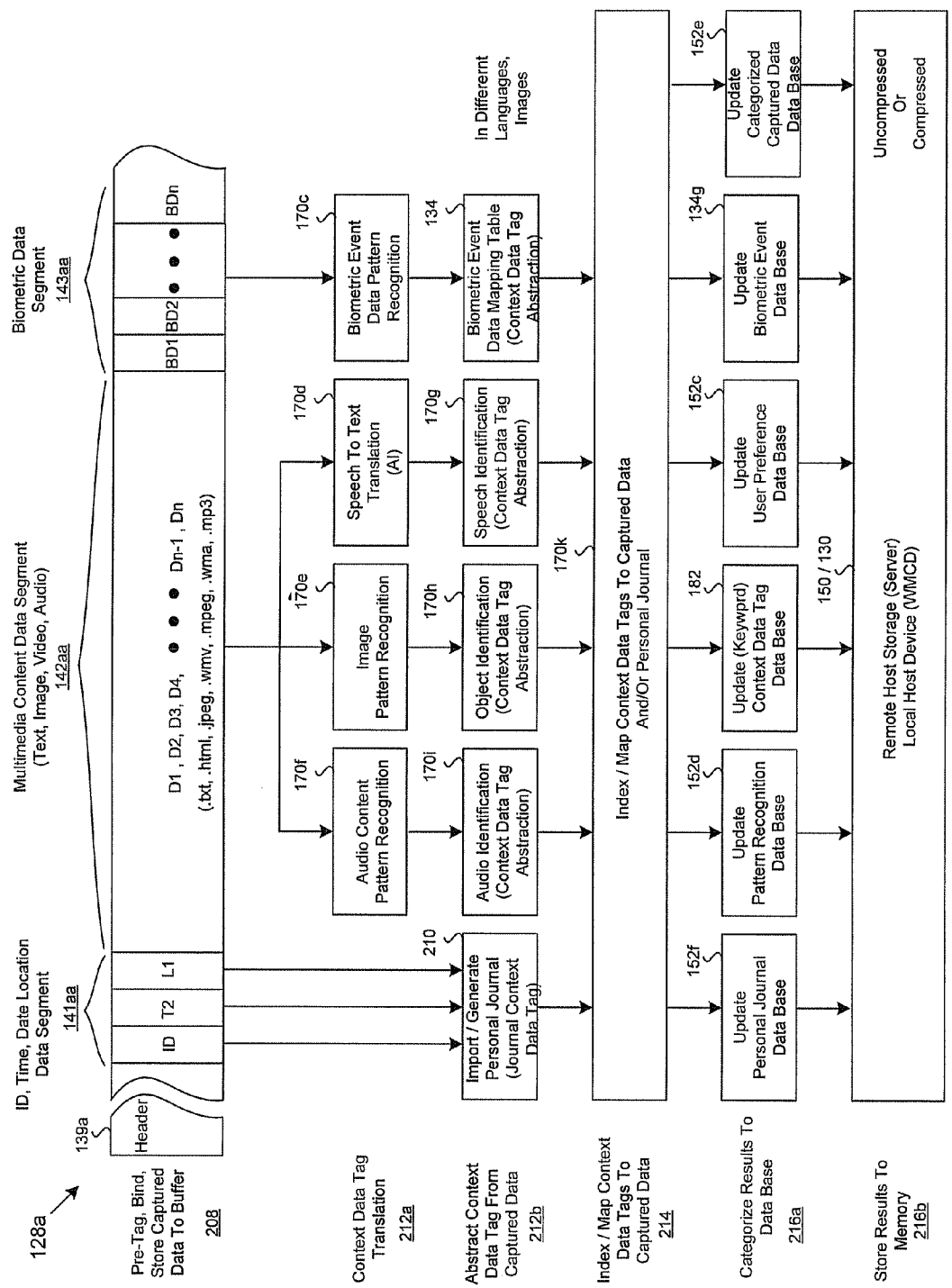
FIG. 2B is a block diagram that illustrates exemplary steps of tagging captured data with context data tag utilizing user preference information and utilizing tagged captured data to create and/or maintain a personal journal, in accordance with an exemplary embodiment of the invention.

FIG. 2B is a block diagram that illustrates exemplary steps of tagging captured data with context data tag utilizing user preference information and utilizing tagged captured data to create and/or maintain a personal journal, in accordance with an exemplary embodiment of the invention. The steps in FIG. 2B may further describe the steps 208 to 216 in FIG. 2A. Referring to FIG. 2B, there is shown a pre-tagged captured data frame 128a. In step 208, the multimedia content data segment 142aa may be pre-tagged with ID, time, date and location data in the data segment 141aa and biometric event data in the data segment 143aa.

In step 212a, the header 139a of the captured data frame 128a may instruct the CPU/processor 124 or 154 to load one or more applications to interpret the data in each of the data segments 141aa, 142aa and 143aa. In an exemplary embodiment of the invention, the data segment 142aa may comprise multimedia content such as text, human speech, video, still image content and/or audio content. A speech to text translator application 170d or an Artificial Intelligence program (AI) may interpret the human speech content and translate the content into text format. An image pattern recognition application 170e may interpret or translate moving images such as video or still images content, color content into text. An audio content pattern recognition application 170f may translate or characterize different audible tones, or noise into text description such as sirens, engine noise, and animal noise, for example.

The biometric event data BD1 to BDn may be interpreted by one or more biometric event pattern recognition applications 170c to infer physiological and/or behavioral conditions such as brain wave pattern analysis, galvanic skin responses, pupil dilation pulse changes, for example. The plurality of translation applications may coordinate together to provide sufficient information to interpret the multimedia content data or biometric event data into text format for context data tags abstraction in step 212b.

In step 212b, context data tags in the form of text keywords may be abstracted from the text information of each of the data segments 141aa, 142aa, 143aa. For example, a keyword such as "ANXIOUS" 182c may be abstracted as a context data tag to describe a mood condition of the cyclist 108. A biometric event data mapping table 134 may later be constructed by indexing the context data tags according to the categories of physical condition 134a, mood condition 134b, mental state 134c and character condition 134d. Likewise, speech context data tags 170g may be abstracted from translated speech to text information, object identification context data text 170h may be may be abstracted from image pattern recognition text information, audio identification data context tags 170i may be abstracted from audio content pattern recognition text information.

The user ID, time, date and location information from data segment 141aa may similarly be abstracted with context data tags as journal context data tags 210 from suitable codes per header 139a instructions. Alternately, the personal journal context data tags 210 in data segment 141 as may be abstracted from data imported from a user's calendar or a personal journal schedule. In step 214, the context data tags from biometric event data 134, speech identification 170g, object identification 170h, audio identification 170i and journal context data tags 210 may be analyzed, indexed and virtually mapped to the captured data 128 or to a personal journal 129 (shown in FIG. 2C) according to respective data bases.

In step 216a, the analyzed, indexed and mapped results of context data tags from the data segments 141aa, 142aa and 143aa may be updated and categorized to a plurality of data bases. For example, the captured event data base 152e that may comprise the named captured data file 135, the biometric event data base 134g that may comprise biometric event data mapping table 134, the user preference data base 152c that may comprise the user preferences 152ca, 152cb, 152cc, the context data tag data base 182 that may comprise keywords to the context data tags, the pattern recognition data base 152d that may comprise patterns for multimedia data and biometric event data and the personal journal data base 152f that may comprise the personal journal 120d or 152f. In step 216b, the results of data bases named in step 216a may be stored in the memory of the local host device such as the WMCD 130 or remotely in the remote host storage device 150 such as a server.

Figure 2C:
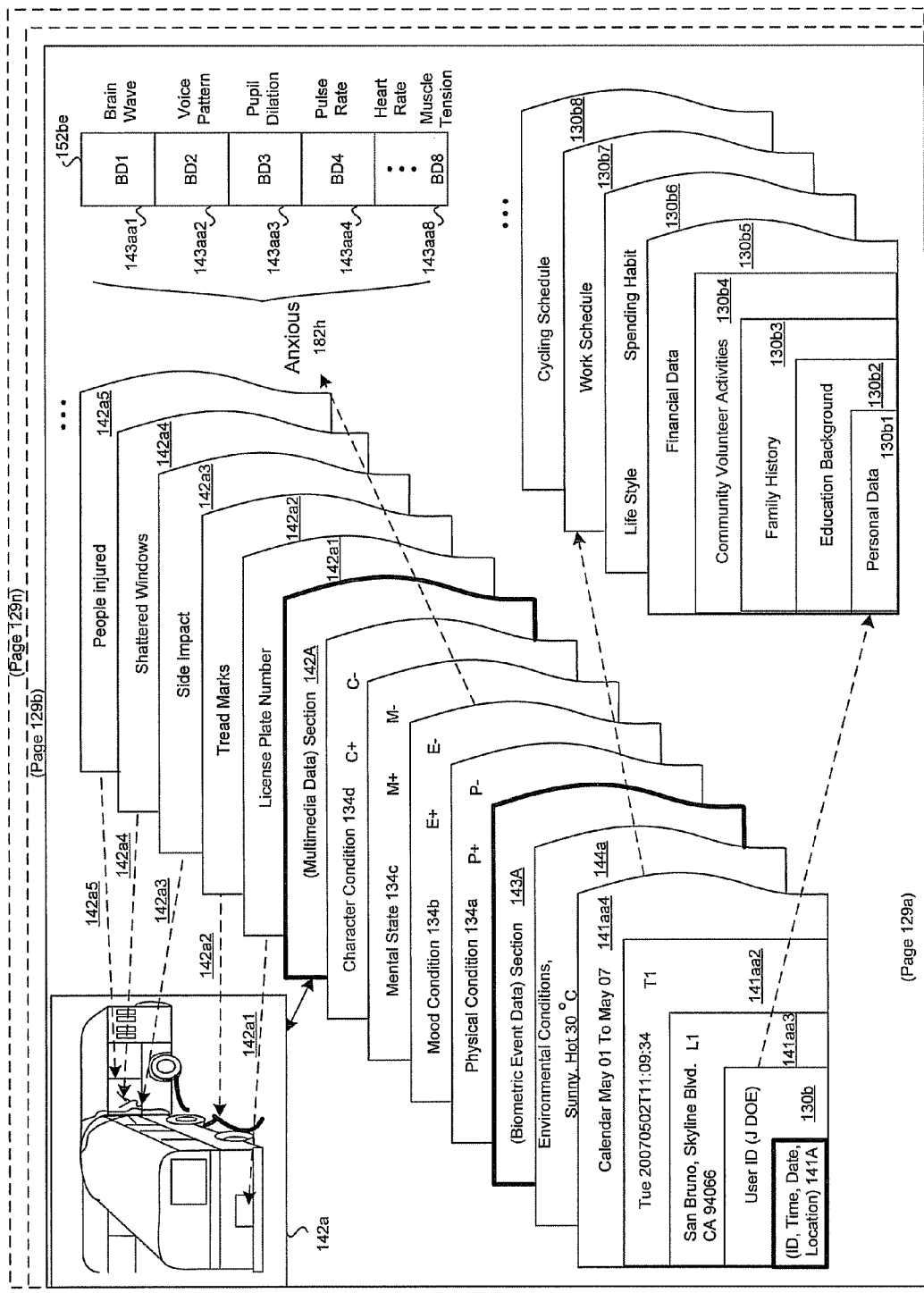
FIG. 2C is a block diagram that illustrates exemplary indexing and mapping of context data tags to captured data in a personalized journal, in accordance with an exemplary embodiment of the invention.

FIG. 2C is a block diagram that illustrates exemplary indexing and mapping of context data tags to captured data in a personalized journal, in accordance with an exemplary embodiment of the invention. FIG. 2C may further illustrate the organization of a personal journal 129 with context data tags indexed and mapped to the captured data 128 described in step 214 of FIGS. 2A and 2B. Referring to FIG. 2C, there is shown a personal journal 129 comprising one or more personal journal pages 129a to 129n. In an exemplary embodiment of the invention, a personal journal page such as page 129a may comprise a plurality of indexed context data tags virtually mapped to the data in each of the data segments 141aa, 142aa, 143aa in the captured data frame 128a. The personal journal pages 129a to 129n may be virtually mapped to each of the corresponding captured data frames 128a to 128n. Alternately, the entire data content of captured data frames 128a to 128n may be virtually mapped to a single page such as page 129a to be illustrated in this example.

Personal journal page 129a may comprise indexed sections 141A, 142a, 143A corresponding to data segments 141aa, 142aa and 143aa of captured data frames 128a to 128n. Each of sections 141A to 143A may comprise context data tags, for example in text format or other suitable language such as a markup language such as HTML, or XML, which may be further categorized and indexed to enable efficient keyword search and retrieval of captured data 128 upon a user query. Section 141A may comprise indexed information of User ID 130b, location L1 141aa3, user's calendar for a week 141aa4, the location environmental condition 144a. The user ID 130b may be further mapped to a data base with detail information of the user that may be stored at the local device WMCD 130, the remote host or storage 150 or at another host storage device such as an institutional central data base. The user ID 130b may comprise the user's personal data 130b1, education background 130b2, and family history 130b3 such as names of user's family members, friends, and relatives. Other personal data may comprise community volunteer activities 130b4 such as user's services at local charities or user's church functions. Personal data may also comprise financial data 130b5 such as user's income level, life style and spending habit 130b6 such as user's favorite clothing brand or vacation destinations.

The calendar 141 as may comprise a user's work schedule, cycling schedule, usual cycling route to work including the location information L1 where the accident scene or event 200 was witnessed. Other calendar information may include daily weather report with recorded weather condition 144a that may be imported from a weather website link as part of pre-tagging the calendar and the captured data 128. Section 143A may comprise indexed information corresponding to the biometric event data mapping table 134 in FIG. 1F with indexed subsections corresponding to physical condition 134a, mood condition 134b, mental state 134c and character condition 134d. For example, subsection Mood Condition 134b may comprise the context data tag "Anxious" 182h that may be mapped to the respective biometric event data BD1 143aa1 to BD8 143aa8. The section 142A may comprise indexed information corresponding to multimedia content data segments 142aa to 142nn of captured data frames 128a to 128n.

The section 142A may further comprise subsections with specific information about the details of the bus accident scene or event 200. The extent of details may be limited by the quality or resolution of the acquired multimedia data 142a to 142n such as the pixel resolution of the camera 102a, 102b and/or the additional host device such as the surveillance camera 130c, the voice quality of the Bluetooth enabled hearing and speech device 102c, for example. The multimedia data may be still images captured by the cameras 102a and 102b, together both may provide sufficient resolution to allow the image pattern recognition application 170e to identify and abstract information into context data tags such as license plate 142a1, tread marks 142a2, side impact 142a3, shattered windows 142a4 and/or injured people 142a5, for example.

Other details that may comprise subsection indexing may comprise focal length of the cameras 102a, 102b, 130c, direction of camera, amount of camera motion, scene motion, presence or identify of other people at the scene, presence of identified host devices, background color, biometric data of people at the scene. In another embodiment of the invention, certain details in subsection indexing of sections 141A, 142A and 143A may be deleted and stored as a lower resolution personal journal 120d in the WMCD 130. At the time of a user query, the lower resolution personal journal 120d may be searched locally with efficiency despite the limited memory or CPU processing power of the WMCD 130. If more details or higher resolution image may be needed, the cyclist 108 may query and download the high resolution image from the personal journal 129 stored in the remote host or storage 150.

In accordance with various embodiments of the invention, the method for handling data 142a to 142n may comprise in a wireless communication device WMCD 130 tagging captured data 128 based on a specified event with context data tags, 141aa1 to 141aa4, 142a1 to 142a5, and 182a to 182h. The context data tags may utilize user preference information 120b, 152ca, 152cb or 152cc stored in the WMCD 130 while captured data 128 may be generated and/or maintained in the WMCD 130. The tagged captured data 128 may be utilized to create and/or maintain a personal journal 120d or 129 in the WMCD 130.

The user preferences 120b, 152ca, 152cb or 152cc may link to information such as the lower resolution captured data 128Y or personal journal 120d stored in the WMCD 130. Alternately, the user preferences 120b, 152ca, 152cb or 152cc may link to information such as high resolution captured data 128 or personal journal 129 stored external to the WMCD 130, such as the remote host or storage 150. The user preferences 120b, 152ca, 152cb or 152cc may be associated with, or linked to, for example, time, date and/or location stamped captured data 128 where the location information may be acquired based on GPS data. The captured data 128 may be utilized to abstract context data tags to generate or maintain information such as a biometric event data base 134g, a user preference data base 152c, a pattern recognition data base 152d, a personal journal data base 152f, a categorized captured data base 152e or a context data tag data base 182.

Various embodiments of the invention may generate or abstract context data tags pertaining to the specified event such as the bus accident scene or event 200, where the acquisition of event data inputs 141, 142, 143 may be prompted by the user, or alternately acquired continuously or automatically from without user intervention. The captured data 128 may be acquired by a data acquisition system 110 on the WMCD 130, or in cooperation with other external data acquisition devices or sensors such as the Bluetooth enabled hearing and speech device 102c and/or the Bluetooth enabled cyclist goggle 107b.

A plurality of applications may be utilized to generate and/or maintain the aforementioned data bases. The applications may comprise a categorization algorithm 170a, a pattern recognition algorithm 170b, a biometric event pattern recognition application 170c, and a speech to text translation application 170d, an image pattern recognition application 170e, an audio content pattern recognition application 170f, a calendar or scheduling application 210. The captured data 128 may be retrieved based on a user query, or triggering a context data tag in the user preference 152cb to match to a context data tag data base 182 or to a context data tag in the personal journal 129.

Certain embodiments of the invention may comprise a machine-readable storage having stored thereon, a computer program having at least one code section for creating a personalized journal based on collecting links to information and annotating those links for later retrieval, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for handling data in wireless devices, the method comprising:
   acquiring data in a wireless mobile communication device, wherein said acquired data comprises a plurality of data segments, wherein a first data segment of said acquired data comprises multimedia content data and a second data segment of said acquired data comprises captured behavioral biometric data of said user during said acquiring of data;
   tagging in said wireless mobile communication device, said first data segment with one or more first context data tag; and
   storing said tagged acquired data in a personalized journal database in said wireless mobile communication device based on linking said tagged acquired data to a user's identity.

2. The method according to claim 1, comprising tagging in said wireless mobile communication device, said second data segment with one or more second context data tag, wherein said one or more second context data tag is mapped to said behavioral biometric data.

3. The method according to claim 2, wherein said one or more first and said second context data tags comprise user preference information.

4. The method according to claim 3, wherein said user preference information is stored in said wireless mobile communication device.

5. The method according to claim 3, wherein at least a portion of said user preference information is stored external to said wireless mobile communication device.

6. The method according to claim 3, wherein said user preference information comprises at least one of time and date stamp associated with said acquired data and location stamping associated with location of said wireless mobile communication device during said acquiring of said data.

7. The method according to claim 3, wherein said user preference information comprises at least one of device utilization information associated with said acquired data or one or more applications utilized in conjunction with said acquired data.

8. The method according to claim 7, wherein said one or more applications comprise calendar or scheduling information.

9. The method according to claim 3, comprising retrieving of said acquired data in said wireless mobile communication device based on matching said one or more first or second context data tag to at least a specified prompt to said user preference information.

10. The method according to claim 9, comprising determining occurrence of said at least specified prompt based at least in part on operations, applications, or accessory devices utilized in said user preference information.

11. The method according to claim 10, wherein said applications comprise at least one of search by text application, image pattern recognition application, biometric event pattern recognition application or speech recognition applications.

12. The method according to claim 11, wherein said personal journal comprises indexed contrasted condition context data tags mapped to said behavioral biometric data.

13. The method according to claim 12, wherein said applications comprise algorithms for generating mental state and character condition based on said generated behavioral biometric data.

14. The method according to claim 1, comprising linking a plurality of tagged acquired data concurrently taken from a plurality of mobile communication devices to generate a multiple segment data frame for storage in said personalized journal data base.

15. A system for handling data in wireless devices, the system comprising:
one or more circuits, processors, or any combination thereof operable to acquire data within a wireless mobile communication device, wherein said acquired data comprises a plurality of data segments, wherein a first data segment of said acquired data comprises multimedia content data and a second data segment of said acquired data comprises captured behavioral biometric data of said user during said acquiring of data; and
said one or more circuits, processors, or any combination thereof within said wireless mobile communication device is operable to tag said first data segment of said acquired data with one or more first context data tag, and wherein said tagged acquired data are stored in a personalized journal database in said wireless mobile communication device based on linking said tagged acquired data to a user's identity.

16. The system according to claim 15, wherein said one or more circuits, processors, or any combination thereof enables tagging said second data segment with one or more second context data tag, wherein said one or more second context data tag is mapped to said behavioral biometric data.

17. The system according to claim 15, wherein said one or more first and said second context data tags comprise user preference information.

18. The system according to claim 17, wherein said user preference information is stored in said wireless mobile communication device.

19. The system according to claim 17, wherein said at least one processor enables storing of at least a portion of said user preference information external to said wireless mobile communication device.

20. The system according to claim 17, wherein said user preference information at least one of time and date stamp associated with said acquired data and location stamping associated with location of said wireless mobile communication device during said acquiring of said data.

21. The system according to claim 17, wherein said user preference information comprises at least one of device utilization information associated with said acquired data or one or more applications utilized in conjunction with said acquired data.

22. The system according to claim 21, wherein said one or more applications comprise calendar or scheduling information.

23. The system according to claim 17, wherein said one or more circuits, processors, or any combination thereof retrieves said tagged acquired data in said wireless mobile communication device based on matching said one or more first or second context data tags to at least a specified prompt to said user preference information.

24. The system according to claim 23, wherein said one or more circuits, processors, or any combination thereof determines occurrence of said at least specified prompt based at least in part on operations, applications, or accessory devices utilized in said user preference information.

25. The system according to claim 24, wherein said applications comprise at least one of search by text application, image pattern recognition application, biometric event pattern recognition application or speech recognition applications.

26. The system according to claim 25, wherein said personal journal comprises indexed contrasted condition context data tags mapped to said behavioral biometric data.

27. The system according to claim 26, wherein said applications comprise algorithms for generating mental state and character condition based on said generated behavioral biometric data.

28. The system according to claim 15, wherein said one or more circuits, processors, or any combination thereof enables linking a plurality of tagged acquired data concurrently taken from a plurality of mobile communication devices to generate a multiple segment data frame for storage in said personalized journal data base.

29. A non-transitory computer-readable storage medium having stored thereon, a computer program having at least one code section for processing data in wireless devices, comprising:
acquiring data in a wireless mobile communication device, wherein said acquired data comprises a plurality of data segments, wherein a first data segment of said acquired data comprises multimedia content data and a second data segment of said acquired data comprises captured behavioral biometric data of said user during said acquiring of data;
tagging in said wireless mobile communication device, said first data segment with one or more first context data tag; and
storing said tagged acquired data in a personalized journal database in said wireless mobile communication device based on linking said tagged acquired data to a user's identity.

* * * * *